US010256898B2

United States Patent
Pullela et al.

(10) Patent No.: US 10,256,898 B2
(45) Date of Patent: Apr. 9, 2019

(54) METHOD AND SYSTEM FOR GUARD BAND DETECTION AND FREQUENCY OFFSET DETECTION

(71) Applicant: MaxLinear, Inc., Carlsbad, CA (US)

(72) Inventors: Raja Pullela, Irvine, CA (US); Glenn Chang, Carlsbad, CA (US); Sridhar Ramesh, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 15/692,459

(22) Filed: Aug. 31, 2017

(65) Prior Publication Data

US 2018/0048381 A1  Feb. 15, 2018

Related U.S. Application Data

(63) Continuation of application No. 14/711,057, filed on May 13, 2015, now Pat. No. 9,755,728, which is a continuation of application No. 13/917,794, filed on Jun. 14, 2013, now Pat. No. 9,100,088.

(60) Provisional application No. 61/660,122, filed on Jun. 15, 2012.

(51) Int. Cl.
  *H04B 7/185* (2006.01)
  *H04L 7/033* (2006.01)
  *H04L 7/00* (2006.01)

(52) U.S. Cl.
  CPC ....... *H04B 7/18513* (2013.01); *H04L 7/0054* (2013.01); *H04L 7/0331* (2013.01)

(58) Field of Classification Search
  CPC .. H04B 7/18513; H04L 7/0054; H04L 7/0331
  See application file for complete search history.

(56) References Cited

U.S. PATENT DOCUMENTS

| | | | |
|---|---|---|---|
| 5,507,025 A | 4/1996 | Rodeffer | |
| 5,739,874 A | 4/1998 | Badger et al. | |
| 5,748,046 A | 5/1998 | Badger | |
| 5,793,328 A | 8/1998 | Ward et al. | |
| 5,959,592 A * | 9/1999 | Petruzzelli | H01Q 1/247 343/756 |

(Continued)

*Primary Examiner* — Bobbak Safaipour
(74) *Attorney, Agent, or Firm* — McAndrews, Held & Malloy, Ltd.

(57) ABSTRACT

Methods and systems are provided for guard band detection and frequency offset detection. For each of a plurality of downconverted signals, frequency related information associated with one or more corresponding circuits used in obtaining the plurality of downconverted signals may be determined; and based on the determined frequency related information, one or both of a band stacking operation and a channel stacking operation may be performed. During the band stacking operation, frequency bands are not stacked on each other or stacked frequency bands do not overlap. During the channel stacking operation, channels are not stacked on each other or stacked channels do not overlap. The frequency related information may be determined based on predefined frequency related parameters associated with the corresponding circuits. Frequency corrections may be performed, on output signals corresponding to the band stacking operation and/or the channel stacking operation, based on the frequency related information.

22 Claims, 7 Drawing Sheets

(56) References Cited

U.S. PATENT DOCUMENTS

| | | | |
|---|---|---|---|
| 6,182,011 B1 | 1/2001 | Ward | |
| 6,353,490 B1* | 3/2002 | Singer | H04B 10/271 |
| | | | 348/E7.07 |
| 7,024,190 B1 | 4/2006 | Raust et al. | |
| 7,383,018 B2* | 6/2008 | Knutson | H04H 40/90 |
| | | | 455/3.02 |
| 7,401,349 B2* | 7/2008 | Knutson | H04N 7/20 |
| | | | 725/64 |
| 8,418,210 B2* | 4/2013 | Knutson | H04N 7/20 |
| | | | 725/105 |
| 8,892,026 B2* | 11/2014 | Petrovic | H04B 1/28 |
| | | | 455/3.02 |
| 9,100,088 B2* | 8/2015 | Pullela | H04B 7/18513 |
| 9,755,728 B2* | 9/2017 | Pullela | H04B 7/18513 |
| 2003/0045263 A1 | 3/2003 | Wakayama et al. | |
| 2004/0192190 A1* | 9/2004 | Motoyama | H03F 1/02 |
| | | | 455/3.02 |
| 2006/0128336 A1 | 6/2006 | Waltman et al. | |
| 2009/0041104 A1* | 2/2009 | Bogdan | H03K 5/15013 |
| | | | 375/226 |
| 2009/0110119 A1 | 4/2009 | Ikeda | |
| 2011/0069747 A1* | 3/2011 | Berlotserkovsky | H04B 1/0003 |
| | | | 375/225 |
| 2013/0278480 A1* | 10/2013 | McMilin | H01Q 1/243 |
| | | | 343/904 |
| 2013/0337740 A1* | 12/2013 | Pullela | H04B 7/18513 |
| | | | 455/12.1 |

* cited by examiner

METHOD AND SYSTEM FOR GUARD BAND DETECTION AND FREQUENCY OFFSET DETECTION

CLAIM OF PRIORITY AND CROSS-REFERENCE TO RELATED APPLICATIONS/INCORPORATION BY REFERENCE

This patent application is a continuation of U.S. patent application Ser. No. 14/711,057, filed on May 13, 2015, which is a continuation of U.S. patent application Ser. No. 13/917,794, filed on Jun. 14, 2013, which in turn makes reference to, claims priority to, and claims benefit from U.S. Provisional Application Ser. No. 61/660,122, filed on Jun. 15, 2012. Each of the above stated applications is hereby incorporated herein by reference in its entirety.

This patent application also makes reference to:
U.S. patent application Ser. No. 13/762,939 filed on Feb. 8, 2013; and
U.S. patent application Ser. No. 13/783,130 filed on Mar. 1, 2013.

Each of the above stated applications is hereby incorporated herein by reference in its entirety.

FIELD OF THE INVENTION

Certain embodiments of the invention relate to communication systems. More specifically, certain embodiments of the invention relate to a method and system for guard band detection and frequency offset detection.

BACKGROUND OF THE INVENTION

In satellite reception applications, dielectric resonant oscillators (DROs) are utilized in low noise block downconverters (LNBs) to generate clock signals. However, dielectric resonant oscillators (DROs) may become very unstable (e.g., due to temperature) and may cause frequency errors of the order of approximately 5 MHz.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for guard band detection and frequency offset detection, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
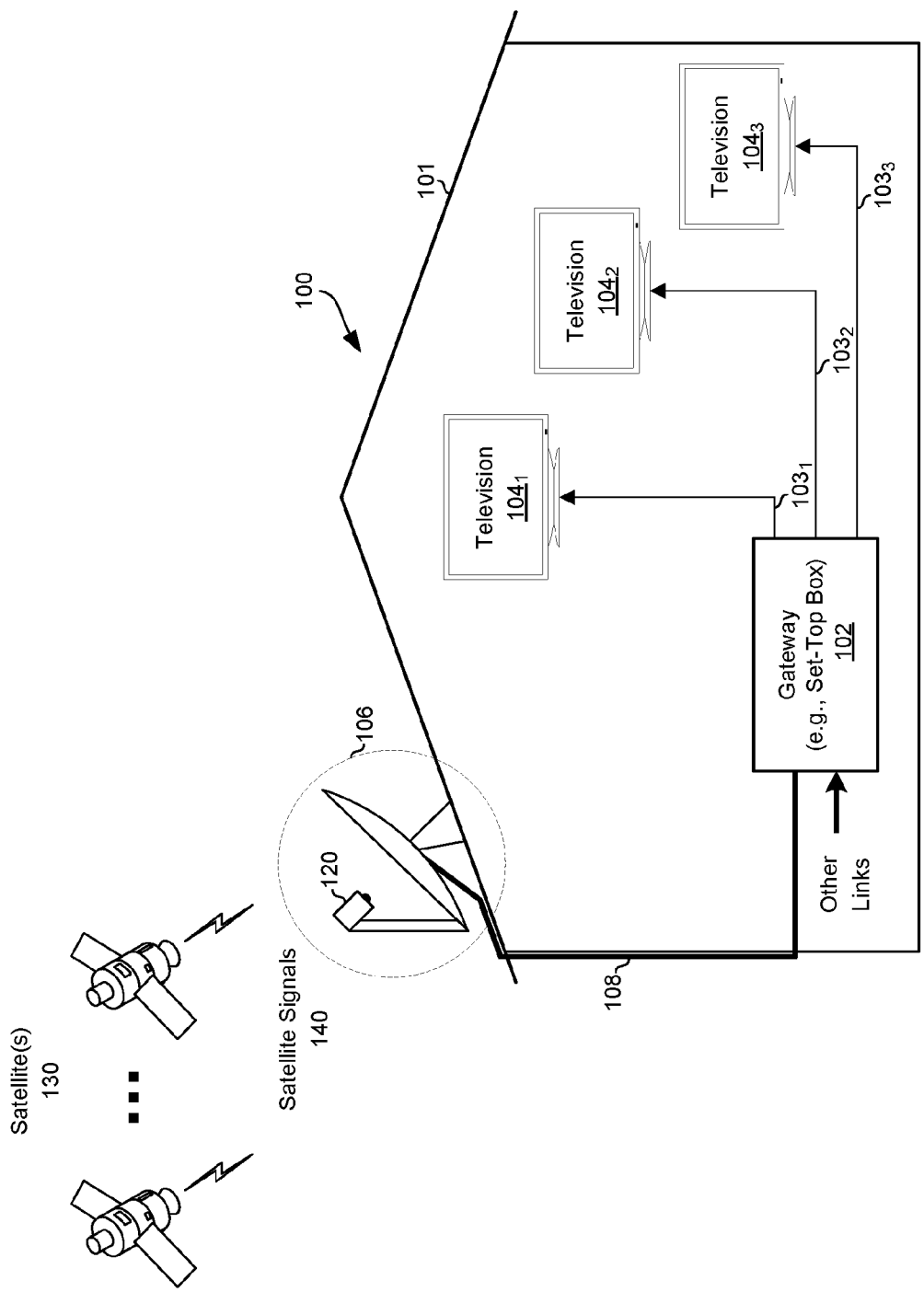
FIG. 1 is a block diagram illustrating an exemplary network comprising satellite television components, in accordance with an example embodiment of the invention.

As utilized herein the terms "circuit" and "circuitry" refer to physical electronic components (i.e. hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Certain embodiments of the invention can be found in a method and system for guard band detection and frequency offset detection. In various embodiments of the invention, a signal processing circuit, which is operational within a satellite reception assembly, may be operable to analyze actual frequency information corresponding to a plurality of downconverted signals. Each of the plurality of downconverted signals may be downconverted using one or more corresponding local oscillators (LOs) in the signal processing circuit. For each of the downconverted signals and based on the analyzing, one or more of at least the following may be determined by the signal processing circuit: (1) one or more frequency offsets, which are associated with the one or more corresponding local oscillators (LOs), in relation to corresponding standard LO frequencies, and (2) one or more actual guard bands between adjacent frequency bands. The signal processing circuit may be operable to generate, for the plurality of downconverted signals, information on one or more of at least the following: the determined frequency offsets and the determined actual guard bands.

The signal processing circuit may then be operable to perform, based on the generated information and using, for example, a band/channel stacking module in the signal processing circuit, one or both of a band stacking operation and a channel stacking operation so that: (1) during the band stacking operation, frequency bands are not stacked on each other or stacked frequency bands do not overlap, and (2) during the channel stacking operation, channels are not stacked on each other or stacked channels do not overlap during the channel stacking operation. The signal processing circuit may also be operable to perform, based on the generated information and using the band/channel stacking module, frequency corrections, in compliance with standard band frequencies and standard channel frequencies, on output signals of the band stacking operation or output signals of the channel stacking operation, for channel tuning in a gateway. In this regard, the signal processing circuit may be operable to downconvert a plurality of radio frequency (RF) signals to the plurality of downconverted signals correspondingly, where each of the RF signals may correspond to one or more satellite frequency bands, and the downconverted signals may comprises, for example, L-band signals or baseband signals. The signal processing circuit may be operable to perform the analyzing, the determining and the generating, using, for example, a frequency detection module in the signal processing circuit.

In an exemplary embodiment of the disclosure, the frequency detection module may comprise a demodulator. In other instances, the frequency detection module may comprise, for example, at least a portion of a demodulator, where the at least a portion of the demodulator may comprise a phase locked loop (PLL).

In an exemplary embodiment of the disclosure, the plurality of downconverted signals may be in digital domain and the frequency detection module may be operational in the digital domain. In such instances, the frequency detection module may perform the analyzing using one or more of the following: a fast fourier transform (FFT), an edge detection and a center-of-mass computation. The frequency detection module may also determine, based on the edge detection, a symbol rate associated with each channel for channel filtering in the band/channel stacking module, during at least the channel stacking operation, for example.

In an exemplary embodiment of the disclosure, each of the local oscillators (LOs) may comprise a dielectric resonant oscillator (DRO). The generated information may comprise, for example, a form of a matrix, where each element of the matrix may correspond to one of at least the following: a particular frequency offset associated with a particular local oscillator (LO) and a particular actual guard band associated with a particular downconverted signal.

FIG. 1 is a block diagram illustrating an exemplary network comprising satellite television components, in accordance with an example embodiment of the invention. Referring to FIG. 1, there is shown an in-premises network 100, a satellite reception assembly 106, a plurality of satellites 130, and a network link 108 for connecting the satellite reception assembly 106 and the in-premises network 100.

The in-premises network 100 may be setup and/or configured to service particular premises 101 (e.g., residential or commercial). In this regard, the in-premises network 100 may facilitate providing broadband and/or television (or other similar content broadcast) access in the premises 101. The in-premises network 100 may comprise, for example, a gateway 102 and a plurality of client devices, of which televisions $104_1$-$104_3$ are shown.

The plurality of satellites 130 may be utilized to transmit (beam down) satellite signals 140. In this regard, the satellite signals 140 may be utilized to broadcast satellite television content. The satellite signals 140 may comprise, for example, K, Ka, and/or Ku band Direct Broadcast Satellite (DBS) signals. The disclosure, however, is not limited to any particular type of satellite signals.

The satellite reception assembly 106 may be referred to as a satellite "dish". In this regard, the satellite reception assembly 106 may comprise circuitry operable to receive satellite signals (e.g., the satellite signals 140), and to process the received satellite signals, such as to recover data carried in the satellite signals (e.g., television channels, media content, etc.), and configure a suitable output corresponding to the recovered data for transmission to other devices that may handle use and/or distribution of the data (e.g., to the gateway 102 via the communication link 108). The satellite reception assembly 106 may comprise a signal processing circuit 120. In this regard, the signal processing circuit 120 may be, for example, part of the satellite reception assembly 106 (e.g., it may be mounted on a boom at or near the focal point of a parabolic reflector), and may comprise circuitry for capturing and processing satellite signals 140.

The signal processing circuit 120 may utilize a plurality of local oscillators (LOs) for processing the satellite signals 140. The local oscillators (LOs) may comprise, for example, dielectric resonant oscillators (DROs). Over time, due to temperature or other environmental conditions, these DROs may become unstable and their frequencies may drift and may result in frequency and timing errors that may be of the order of approximately 5 MHz. In some instances where the bandwidth which may be handled by the gateway 102 may be wide enough to handle this variation in frequency, this may not be an issue. However, in instances of band stacking or channel stacking performed in the signal processing circuit 120, this frequency error may become an issue since overlapping of stacked channels may result.

The communication link 108 may comprise one or more wired, wireless, and/or optical links. The communication link 108 may comprise, for example, a wired (e.g., coaxial and/or twisted-pair) and/or wireless communication medium which carries physical layer symbols in accordance with, for example, Multimedia over Coax Alliance (MoCA), Ethernet, and/or DBS standards. In some instances, the gateway 102 may be configured to terminate other communication links (not shown), which may comprise, for example, a coaxial or twisted-pair cable and/or an optical fiber which carries physical layer symbols in accordance with, for example, DSL, DOCSIS, or Ethernet standards (e.g., to facilitate cable television, terrestrial television, and/or Internet accessibility).

The gateway 102 may comprise circuitry operable to receive the signals communicated over a plurality of links (e.g., the link 108), process the signals as necessary for outputting information contained therein via a plurality of internal links 103 (e.g., $103_1$-$103_3$) within the in-premises network 100. In this regard, the plurality of internal links 103 may comprise wired, wireless, and/or optical links that may be suited for use in an environment such as the in-premises network 100. For example, the internal links 103 may comprise wired connections (e.g., HDMI connections, Display Port links, MoCA links, or Ethernet connection), and/or wireless connections (e.g., Wi-Fi, ZigBee, wireless USB, or the like). The gateway 102 may also comprise circuitry operable to transmit signals via the link 108 and/or any other external links (i.e., links connecting the gateway 102 to external entities, such as broadcast or service head-ends). Accordingly, the term "gateway" in this disclosure refers to a client device which may perform satellite set-top box (STB) functions, cable television receiver functions, terrestrial television receiver functions, WAN/LAN modem functions, etc. In this regard, "satellite set-top box"

functions may comprise functions necessary for delivering data from the satellite reception assembly 106 to devices within the premises 101.

The gateway 102 may be configured to service a plurality of client devices, which may comprise devices that may communicate with the gateway 102 via one or more point-to-point media links (e.g., HDMI, Display Port, analog video links, analog video links, or the like). An example of such client devices is televisions (e.g., televisions $104_1$-$104_3$) and similar devices that may be used in displaying or playing back multimedia content that may be broadcasted (e.g., via terrestrial signals, satellite signal, cable signal, and/or over the Internet).

In operation, the in-premises network 100 may be setup and/or used to provide various services (e.g., broadband and/or television access) within the premises 101. For example, the in-premises network 100 may comprise an Internet Protocol (IP) based network that interconnects various devices, the gateway 102 and the client devices (e.g., the televisions $104_1$-$104_3$), within a physical space (e.g., the premises 101) to each other and/or to access networks for various IP-based services such as IP-based TV (IPTV) services. In this regard, IPTV service may be applications in multicast networks that may provide delivery of broadcast TV and other media-rich services over secure, end-to-end operator managed broadband IP data networks. The gateway 102 may be utilized to service the in-premises network 100, such as by providing broadband and/or television (or other media content) access to a plurality of client devices (e.g., the televisions $104_1$-$104_3$) within the in-premises network 100. In this regard, the gateway 102 may receive signals carrying content that may be forwarded to the client devices for use thereby. For example, the content used (e.g., displayed/played) by the televisions $104_1$-$104_3$ may be based on satellite television broadcasts. In this regard, the satellite reception assembly 106 may be configured to receive the satellite signals 140, and to process the signals such that the signal (or corresponding signals) may be fed into the gateway 102 (via the link 108) for use within the in-premises network 100 (e.g., being forwarded to the televisions $104_1$-$104_3$ via corresponding local links $103_1$-$103_3$). In some instances—e.g., when the televisions $104_1$-$104_3$ may correspond to a plurality of televisions used in different locations (e.g., rooms) in a single dwelling or different units (e.g., apartments) in multi-unit building—it may be desirable to use the televisions $104_1$-$104_3$ for concurrently viewing different contents.

The satellite reception assembly 106 may be configured to concurrently receive a plurality of satellite signal beams (i.e., belonging to different broadcasts). In this regard, the plurality of satellite signal beams may comprise signals transmitted by different satellites and/or signals transmitted by the same satellite with different polarization. Similarly, the gateway 102 may be configured to concurrently handle multiple feeds, which may correspond to different users. In various example implementations, accommodating concurrent servicing (viewing) based on different satellite feeds may be achieved by use of channel stacking and/or band stacking technologies that may be utilized to increase the number of viewing places in the premises 101, while simultaneously minimizing installation and service costs. For example, in the signal processing circuit 120 within the satellite reception assembly 106, channel stacking may be implemented by taking multiple channels from different frequency bands and stacking or combining them together for transmission over the same physical medium (e.g., the link 108). Similarly, band stacking may be implemented by taking a plurality of frequency bands (or sub-bands) and stacking or combining them together for transmission.

In an exemplary embodiment of the disclosure, the signal processing circuit 120 may be operable to perform one or more of at least the following: guard band detection and frequency offset detection so that when stacking is done, one channel or band is not stacked, placed on top of another channel or band, or overlap with another channel or band.

Figure 2:
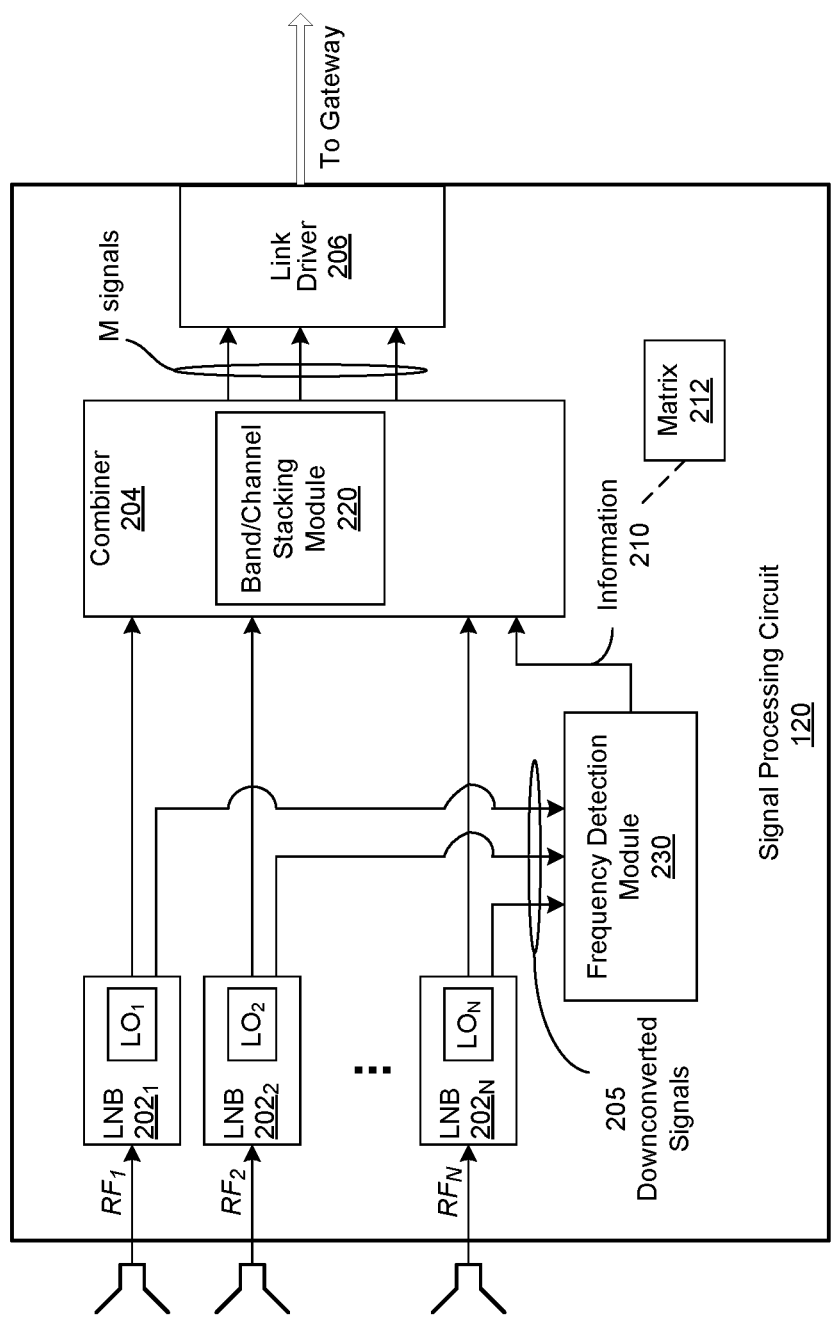
FIG. 2 is a block diagram illustrating an exemplary signal processing circuit within a satellite reception assembly, in accordance with an example embodiment of the invention.

FIG. 2 is a block diagram illustrating an exemplary signal processing circuit within a satellite reception assembly, in accordance with an example embodiment of the invention. Referring to FIG. 2, there is shown the signal processing circuit 120. The signal processing circuit 120 may be as described with respect to FIG. 1, for example. The signal processing circuit 120 may comprise, for example, a plurality of low noise block downconverters (LNBs) $202_1$-$202_N$, a combiner 204, a frequency detection module 230 and a link driver 206.

Each of the LNBs $202_1$-$202_N$ may comprise circuitry operable to receive and handle RF satellite signals (e.g., the satellite signals 140), which may be captured via a reflector of a satellite reception assembly (e.g., the satellite reception assembly 106). In this regard, each LNB $202_i$ may be configured to perform, at least, such functions as low-noise amplification, filtering, and downconverting on a particular received RF (satellite) signals, to enable generating corresponding intermediate frequency (IF) or even baseband signals such as the downconverted signals 205. In this regard, the IF signals 205 may be, for example, in the L-band (950-2150 MHz), half-L-band (950-1450 MHz), extended-L-band (250-2150 MHz, 300-2350 MHz), and the like. The disclosure, however, is not so limited, and the IF signals 205 may span any suitable frequency range. Having N (where N is an integer number) LNBs in the signal processing circuit 120, as illustrated in FIG. 2, may allow receiving N satellite (RF) signals, labeled $RF_1$ to $RF_N$. In this regard, each RF; signal may correspond to a unique/distinct satellite signal and correspond to one or more satellite frequency bands, with the signals differing, for example, based on the source or the polarization (e.g., $RF_1$ may correspond to a first polarization of a first satellite, $RF_2$ may correspond to second polarization of the first satellite, $RF_3$ may correspond to a first polarization of a second satellite, and so on). Each of the LNBs $202_1$-$202_N$ may comprise one or more local oscillators (LOs) such as $LO_1$-$LO_N$. These LOs may be used, for example, to downconvert RF signals ($RF_1$-$RF_N$) to corresponding downconverted signals 205.

The frequency detection module 230 may comprise circuitry operable to receive downconverted signals 205. The frequency detection module 230 may be operable to perform analysis of actual frequency information corresponding to the downconverted signals 205 and generate information (or data) 210 based on the analysis. For example, the information 210 may comprise at least the following: frequency offsets (in relation to corresponding standard LO frequencies) associated with $LO_1$-$LO_N$ and actual guard bands between adjacent frequency bands. In some instances, the information 210 may also comprise symbol rate information associated with the downconverted signals 205. The generated information 210 may be communicated to the combiner 204, for example, for being used by a band/channel stacking module 220 in the combiner 204.

The combiner 204 may be configured to process and combine input signals corresponding to the received RF signals ($RF_1$ to $RF_N$)—i.e., outputs of the LNBs $202_1$-$202_N$. For example, the combiner 204 may be operable to amplify, downconvert, filter and/or digitize at least a portion of the input signals received from the LNBs $202_1$-$202_N$. For example, the combiner 204 may comprise a band/channel stacking module 220 which may be operable to perform a band stacking operation and/or a channel stacking operation. The combiner 204 may be configured to support full-spectrum (or full band)—i.e., to capture an entire spectrum (or an entire band) of each of one or more signals of interest which may be concurrently digitized, or to only digitize a portion of the input signals, such as depending on which channels (or sub-bands) in the signals are selected by client devices (e.g., which television channels are being consumed by the client devices). Once the processing of the input signals (or portions thereof) is complete, the combiner 204 may be operable to recover information carried in the signals (e.g., one or more channels contained therein), and may generate output signals (e.g., M output signals, where M is an integer number) carrying the recovered information. The output signals may be sent to the link driver 208, for transmission thereby (e.g., to the gateway 102). In some instances, the output signals may be further processed in the combiner 204 before being forwarded to the link driver 208. For example, the combiner 204 may be operable to convert to analog, upconvert, filter, and/or amplify the output signals.

The link driver 206 may be operable to process signals generated via the combiner 204 (e.g., comprising recovered information) and generate signals that may be transmitted onto a link to a corresponding link-peer device, such as a gateway/STB (e.g., link 108 to gateway 102 of FIG. 1) in a format supported by the link-peer device. For example, the link driver 206 may be operable to packetize and transmit data received via signals $RF_1$-$RF_N$, in accordance with one or more networking standards (e.g., Ethernet, Multimedia over Coax Alliance (MoCA), DOCSIS, and the like) to a link-peer device that receives satellite data using such standards. Additionally, or alternatively, the link driver 206 may be operable to perform operations (e.g., digital to analog conversion, modulation, frequency conversion, etc.) for outputting the data according to one or more multimedia standards (e.g., ATSC, DVB-S, ISDB-S, and the like) to enable receiving satellite data by client devices using such standards. The output of the link driver 206 may comprise, for example, a plurality of IF signals, in a particular range to which the link-peer device (e.g., the gateway 102) may tune. For example, each of the IF signals may be in the L-band (950 MHz to 2150 MHz).

In various example implementations, the band/channel stacking module 220 may be configured to handle and/or support channel stacking and/or band stacking using, for example, integrated stacking based architectures. In this regard, integrated stacking based architectures may comprise, for example, analog stacking architectures or digital stacking architectures. For example, in an example implementation, an analog stacking circuit may be used, and may comprise integrated filters for example. The filters may be configured to filter through particular portions (e.g., corresponding to particular channels or sub-bands). The analog stacking circuit may provide analog capture utilizing an analog multiple input and multiple output crossbar (Xbar). In this regard, the crossbar (Xbar) may be configured such that one or more inputs (comprising particular channels or sub-bands) may be combined and mapped to one or more outputs. In another example implementation, a digital stacking circuit may be used, to provide digital capture using full band stacking. The digital stacking circuit may be operable to provide digital capture utilizing a digital multiple input and multiple output digital crossbar. Furthermore, to allow for the digitization, the digital stacking circuit may be configured to provide analog-to-digital conversion (and, if needed, digital-to-analog conversion, such as when the system output need be analog).

In operation, the frequency detection module 230 may be operable to analyze actual frequency information corresponding to a plurality of downconverted signals 205. Each of the plurality of downconverted signals 250 may be downconverted using one or more corresponding local oscillators (e.g., the $LO_1$ in the LNB $202_1$). For each of the downconverted signals 205 and based on the analyzing, one or more of at least the following may be determined by the frequency detection module 230: (1) one or more frequency offsets, which are associated with the one or more corresponding local oscillators (e.g., $LO_1$), in relation to corresponding standard LO frequencies, and (2) one or more actual guard bands between adjacent frequency bands. The frequency detection module 230 may be operable to generate, for the plurality of downconverted signals 205, information 210 on one or more of at least the following: the determined frequency offsets and the determined actual guard bands. The generated information 210 may be communicated to the band/channel stacking module 220.

The band/channel stacking module 220 may then be operable to perform, based on the communicated generated information 210, one or both of a band stacking operation and a channel stacking operation so that: (1) during the band stacking operation, frequency bands are not stacked on each other or stacked frequency bands do not overlap, and (2) during the channel stacking operation, channels are not stacked on each other or stacked channels do not overlap during the channel stacking operation. The band/channel stacking module 220 may also be operable to perform, based on the communicated generated information 210, frequency corrections, in compliance with standard band frequencies and standard channel frequencies, on output signals of the band stacking operation or output signals of the channel stacking operation, for channel tuning in a gateway such as the gateway 102 of FIG. 1.

In an exemplary embodiment of the disclosure, the generated information 210 may comprise, for example, a form of a matrix 212, where each element of the matrix 212 corresponds to one of at least the following: a particular frequency offset associated with a particular local oscillator (e.g., one of the $LO_1$-$LO_N$) and a particular actual guard band associated with a particular downconverted signal (e.g., one of the downconverted signals 205).

Figure 3:
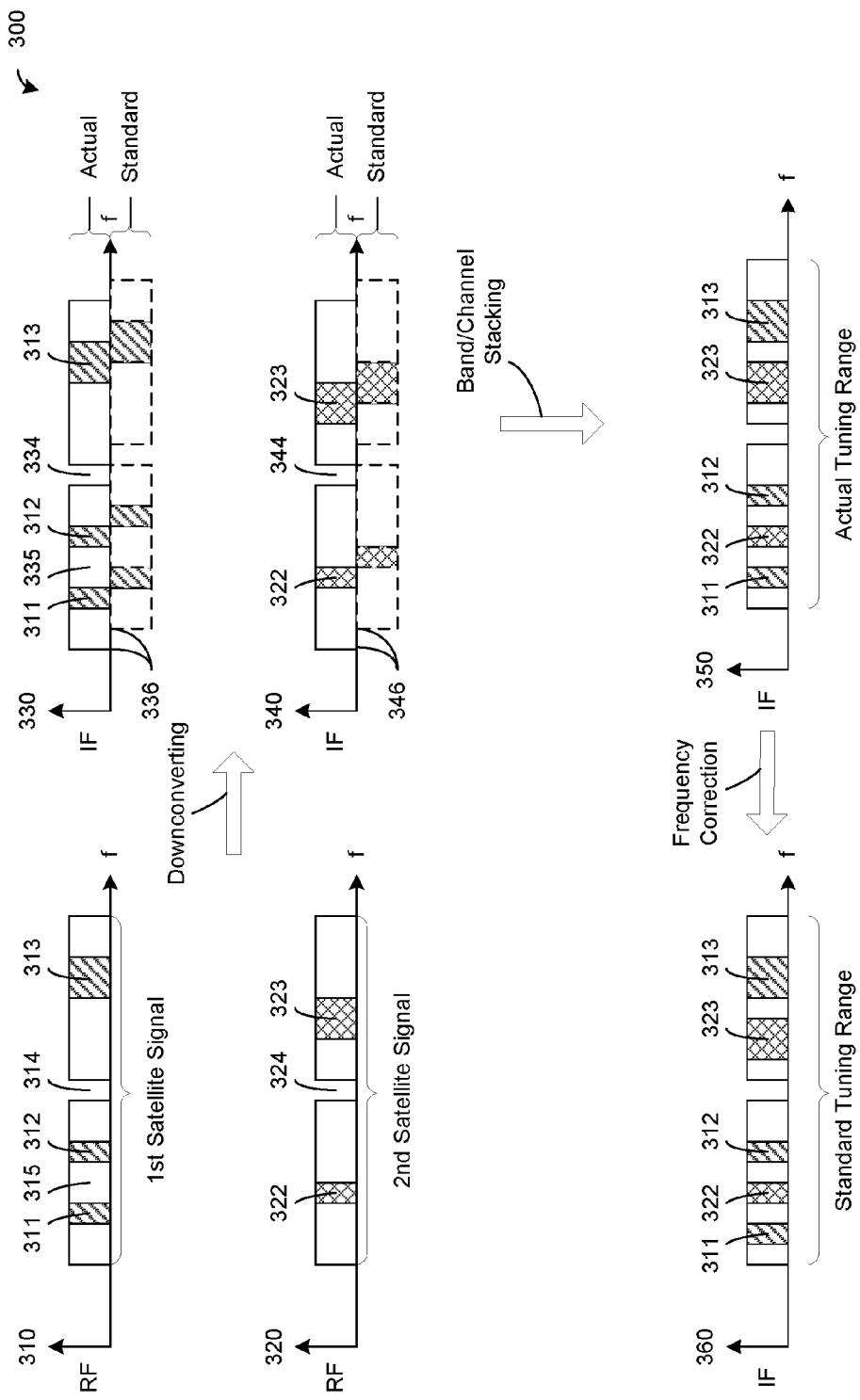
FIG. 3 is a block diagram illustrating an exemplary stacking scheme, in accordance with an example embodiment of the invention.

FIG. 3 is a block diagram illustrating an exemplary stacking scheme, in accordance with an example embodiment of the invention. Referring to FIG. 3, there is shown a scheme 300 for staking channels or bands from different satellite beams. In this regard, use of the scheme 300 may allow combining content from multiple satellite signals such as the satellite signals 140 of FIG. 1 onto a single physical link for conveyance to a gateway/set-top box (STB), such as the gateway 102 of FIG. 1, for example.

In the example implementation shown in FIG. 3, channels (or bands) from two satellite (RF) signals 310 and 320 may be downconverted and then be stacked onto a single IF signal. The satellite signal 310 may comprise, for example, portions 311, 312, 313 and guard bands 313, 314. The satellite signal 320 may comprise, for example, portions 322, 323 and a guard band 324. The portions 311, 312, 313, and the portions 322, 323 may correspond to, for example, individual channels or sub-bands in the satellite signals 310 and 320 respectively. In this regard, initially, each of the received satellite signals 310 and 320 may be downconverted via corresponding LNBs such as the LNBs $202_1$ and $202_2$. Due to frequency offsets 336, 346 associated with the $LO_1$ used in the LNB $202_1$ and the $LO_2$ used in the LNB $202_2$ respectively, the actual downconverted (IF) signals 330, 340 may be different from corresponding standard downconverted (IF) signals (without frequency drifts). In this regard, the signal 330 may comprise actual guard bands 334, 335 which may be different from corresponding standard guard bands (without frequency drifts), for example. The signal 340 may comprise actual guard band 344 which may be different from corresponding standard guard band (without frequency drifts), for example.

The signals 330, 340 may then be input to a band/channel stacking module such as, for example, the band/channel stacking module 220. In this regard, the band/channel stacking module 220 may be configured to combine the content (e.g., the portions 311, 312, 313, 322, 323) of the signals 330, 340, such as by stacking channels or bands within these signals 330, 340 onto a single signal 350. During the band stacking operation or the channel stacking operation, the band/channel stacking module 220 may utilize information on the frequency offsets 336, 346 and the actual guard bands 334, 335, 344 for the band stacking or the channel stacking so that frequency bands (sub-bands) or channels in the signal 350 are not stacked on each other, or stacked frequency bands (sub-bands) or stacked channels do not overlap. The band/channel stacking module 220 may then be operable to perform frequency correction, in compliance with standard band frequencies and standard channel frequencies, on the signal 350 so as to generate a signal 360. In this regard, the signal 360 may comprise a frequency band within standard tuning range for channel tuning by a gateway such as the gateway 102.

Accordingly, since the gateway 102 is operable to tune to a frequency band of the signal 360, the gateway 102 may be enabled to concurrently receive satellite content carried in the portions 311, 312, 313 of the satellite signal 310 and in portions 322, 323 of the satellite signal 320. The satellite signals 310, 320 may comprise, for example, signals from satellite transponders transmitting content (e.g., television channels) that have been selected for consumption by the gateway 102.

Figure 4:
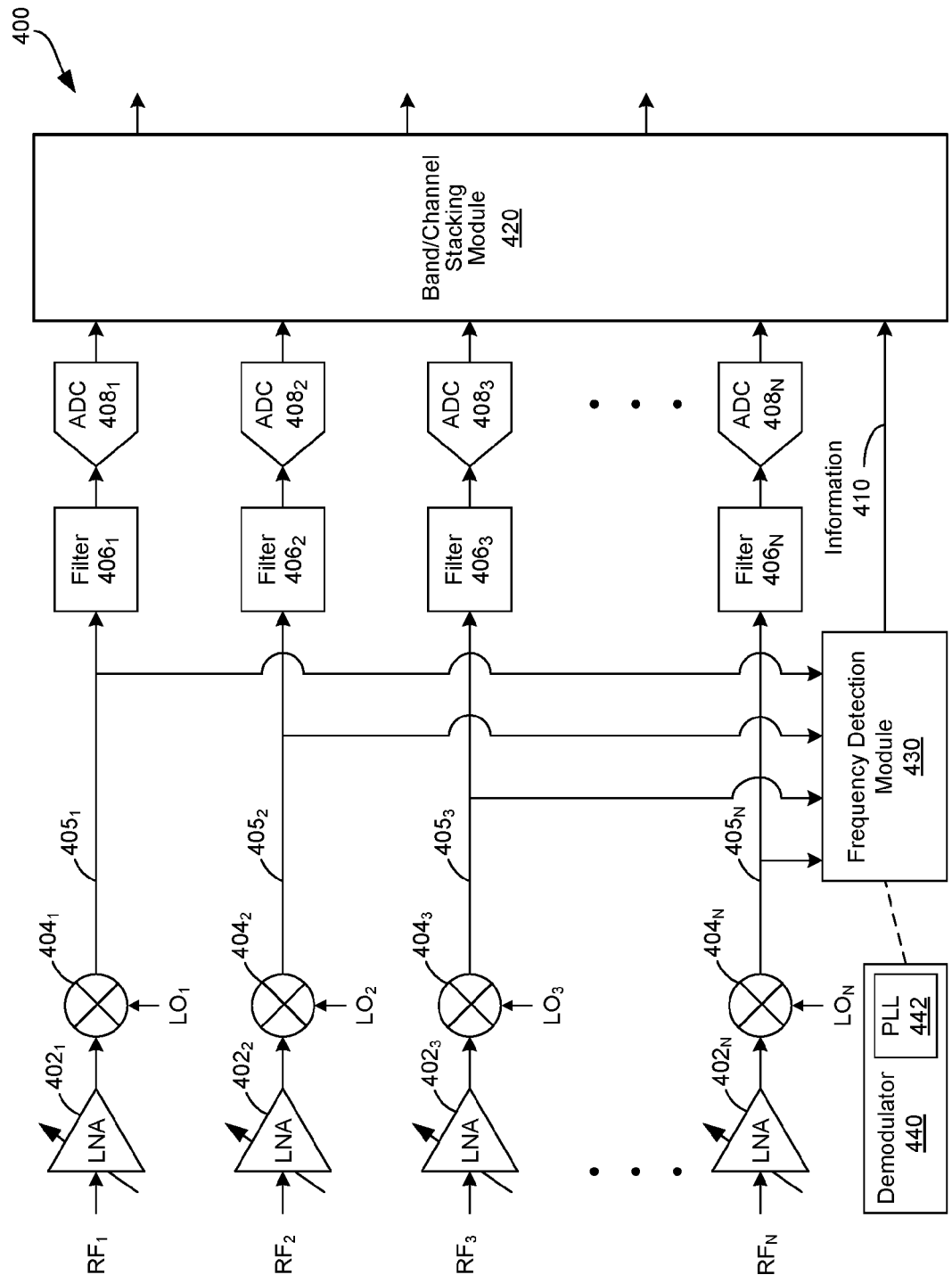
FIG. 4 is a block diagram illustrating an exemplary circuit that is operable to provide guard band detection and frequency offset detection, in accordance with an example embodiment of the invention.

FIG. 4 is a block diagram illustrating an exemplary circuit that is operable to provide guard band detection and frequency offset detection, in accordance with an example embodiment of the invention. Referring to FIG. 4, there is shown a system 400. The system 400 may comprise suitable circuitry, logic, code, and/or interfaces for performing and/or supporting one or both of band stacking and channel stacking. Input RF signals $RF_1$-$RF_N$ (N is an integer number) may correspond to different satellite signals (i.e., originating from different sources and/or having different polarization). The system 400 may comprise a relevant portion of the signal processing circuit 120. For example, the system 400 may correspond to the LNBs $202_1$-$202_N$, the frequency detection module 230 and at least a portion of the combiner 204 including the back/channel stacking module 220, described with respect to FIG. 2. In this regard, the system 400 may comprise, for example, a plurality of low-noise amplifiers (LNAs) $402_1$-$402_N$, a plurality of mixers $404_1$-$404_N$, a plurality of filters $406_1$-$406_N$, a plurality of analog-to-digital converters (ADCs) $408_1$-$408_N$, a frequency detection module 430, and a band/channel stacking module 420. The mixers $404_1$-$404_N$ may receive input signals from $LO_1$-$LO_N$ respectively.

The frequency detection module 430 may be substantially similar to the frequency detection module 230 described with respect to FIG. 2, for example. The band/channel stacking module 420 may be substantially similar to the band/channel stacking module 220 described with respect to FIG. 2, for example. Each of the LNA $402_1$-$402_N$ may be operable to amplify, for example, weak satellite signals (e.g., $RF_1$-$RF_N$). Each of the mixers $404_1$-$404_N$ may be operable to downconvert a satellite frequency band to, for example, an IF band or even to a baseband utilizing the $LO_1$-$LO_N$ respectively. For example, one or more X, Ku and/or Ka satellite frequency bands may be downconverted to L-band. Each of the downconverted signals $405_1$-$405_N$ may be input to the frequency detection module 430. Frequency information associated with each of the signals $405_1$-$405_N$ may then be analyzed by the frequency detection module 430. The frequency detection module 430 may be operable to generate, based on the analyzing, information 410 which may be inputted to the band/channel stacking module 420. In this regard, the information 410 may be substantially similar to the information 210 described with respect to FIG. 2, for example. The filters $406_1$-$406_N$ may be operable to filter signals $405_1$-$405_N$, based on one or more criteria. For example, the filters $406_1$-$406_N$ may be configured as low-pass filters (LPFs)—that is to pass low-frequency signals (below particular threshold, or a "cutoff frequency") and to attenuate signals with frequencies higher than the "cutoff frequency". The ADCs $408_1$-$408_N$ may be operable to perform analog-to-digital conversions (e.g., on outputs of the filters $406_1$-$406_N$).

In an exemplary operation, the frequency detection module 430 may perform functions as described with respect to the frequency detection module 230 of FIG. 2, for example. In an exemplary embodiment of the disclosure, the frequency detection module 430 may comprise a demodulator 440. For example, in some implementation where there is a plurality of demodulators in the signal processing circuit 120, any unused demodulator may be utilized by the signal processing circuit 120 as the frequency detection module 430. In other instances, the frequency detection module 430 may comprise at least a portion of the demodulator 440, and the at least a portion of the demodulator 440 may comprise, for example, a phase locked loop (PLL) 442. In this regard, for example, the portion of the demodulator 440 for the frequency detection module 430 may be implemented without a forward error correction (FEC).

Figure 5:
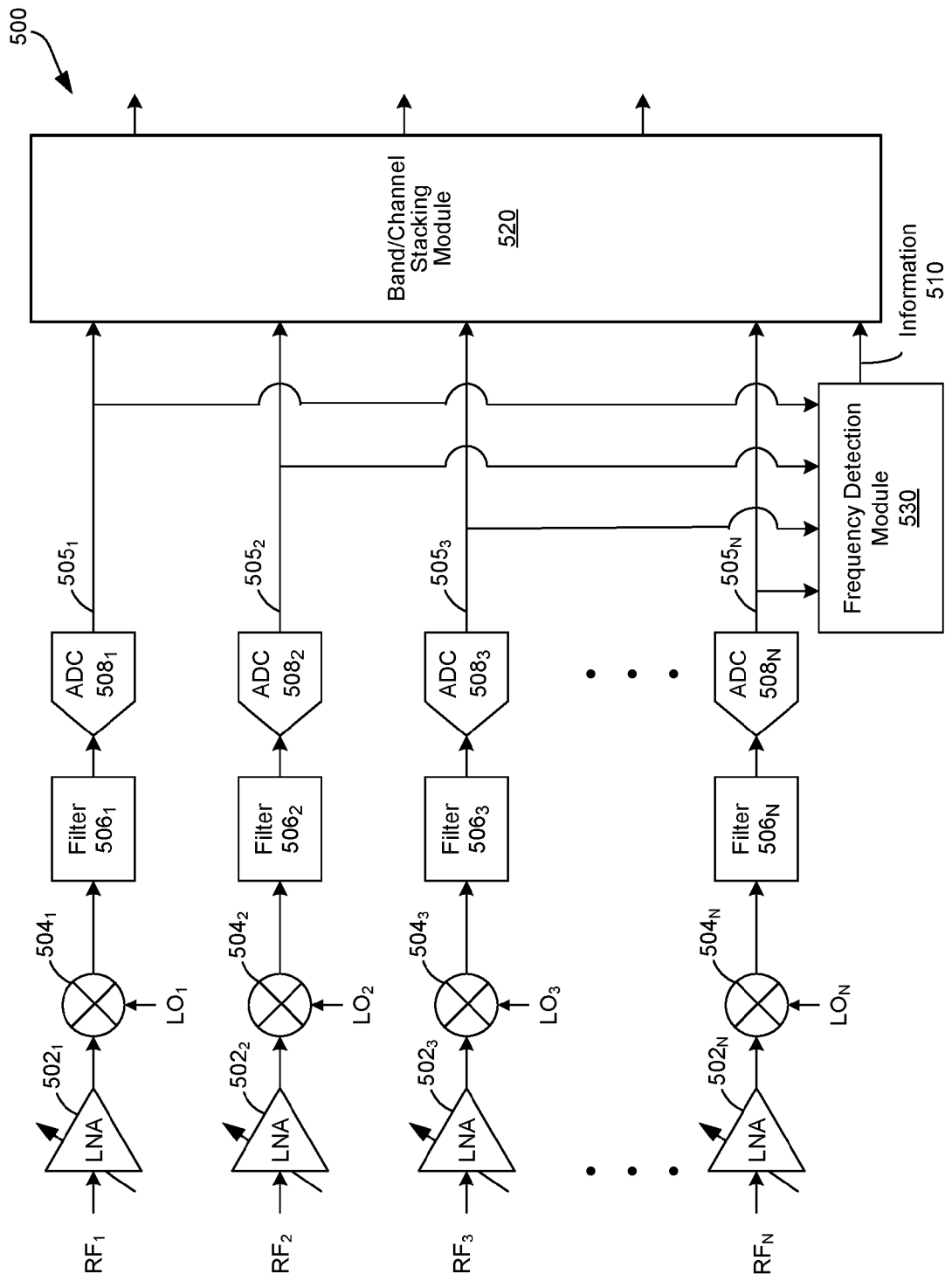
FIG. 5 is a block diagram illustrating an exemplary circuit that is operable to provide guard band detection and frequency offset detection, in accordance with an example embodiment of the invention.

FIG. 5 is a block diagram illustrating an exemplary circuit that is operable to provide guard band detection and frequency offset detection, in accordance with an example embodiment of the invention. Referring to FIG. 5, there is shown a system 500. The system 500 may comprise suitable circuitry, logic, code, and/or interfaces for performing and/or supporting one or both of band stacking and channel stacking. Input RF signals $RF_1$-$RF_N$ (N is an integer number) may correspond to different satellite signals (i.e., originating from different sources and/or having different polarization). The system 500 may comprise a relevant portion of the signal processing circuit 120. For example, the system 500 may correspond to the LNBs $202_1$-$202_N$, the frequency detection module 230 and at least a portion of the combiner 204 including the back/channel stacking module 220, described with respect to FIG. 2. In this regard, the system 500 may comprise, for example, a plurality of low-noise amplifiers (LNAs) $502_1$-$502_N$, a plurality of mixers $504_1$-$504_N$, a plurality of filters $506_1$-$506_N$, a plurality of analog-to-digital converters (ADCs) $508_1$-$508_N$, a frequency detection module 530, and a band/channel stacking module 520. The mixers $504_1$-$504_N$ may receive input signals from $LO_1$-$LO_N$ respectively.

The frequency detection module 530 may be substantially similar to the frequency detection module 230 described with respect to FIG. 2, for example. The band/channel stacking module 520 may be substantially similar to the band/channel stacking module 220 described with respect to FIG. 2, for example. Each of the LNA $502_1$-$502_N$ may be operable to amplify, for example, weak satellite signals (e.g., $RF_1$—$RF_N$). Each of the mixers $504_1$-$504_N$ may be operable to downconvert a satellite frequency band to, for example, an IF band or even to a baseband utilizing the $LO_1$-$LO_N$ respectively. For example, one or more X, Ku and/or Ka satellite frequency bands may be downconverted to L-band. The filters $506_1$-$506_N$ may be operable to filter signals outputted from the mixers $504_1$-$504_N$, based on one or more criteria. For example, the filters $506_1$-$506_N$ may be configured as low-pass filters (LPFs)—that is to pass low-frequency signals (below particular threshold, or a "cutoff frequency") and to attenuate signals with frequencies higher than the "cutoff frequency". The ADCs $508_1$-$508_N$ may be operable to perform analog-to-digital conversions (e.g., on outputs of the filters $506_1$-$506_N$). Each of the downconverted digital signals $505_1$-$505_N$ may be input to the frequency detection module 530. Frequency information associated with each of the signals $505_1$-$505_N$ may then be analyzed by the frequency detection module 530. The frequency detection module 530 may be operable to generate, based on the analyzing, information 510 which may be inputted to the band/channel stacking module 520. In this regard, the information 510 may be substantially similar to the information 210 described with respect to FIG. 2.

In an exemplary operation, the frequency detection module 530 may perform functions as described with respect to the frequency detection module 230 of FIG. 2, for example. In an exemplary embodiment of the disclosure, the frequency detection module 530 may be operational in digital domain as the downconverted digital signals $505_1$-$505_N$ are in the digital domain. In this regard, the frequency detection module 530 may perform the analyzing using one or more of the following: a fast fourier transform (FFT), an edge detection and a center-of-mass computation. An exemplary implementation for the FFT, the edge detection and the center-of-mass computation is provided in FIG. 6. The frequency detection module 530 may also be operable to determine, based on the edge detection, a symbol rate (or baud rate) associated with each channel for channel filtering in the band/channel stacking module 520, during at least the channel stacking operation, for example. In this regard, the information 510, generated by the frequency detection module 530, may also include information on the symbol rate (in addition to the frequency offsets and the actual guard bands). For example, based on the edge detection, an actual lower edge and an actual higher edge of a particular channel may be determined. Accordingly, a bandwidth of the particular channel may be determined based on the lower edge and the higher edge. In this regard, the symbol rate associated with the particular channel may also be determined, as the symbol rate is a function of the bandwidth.

In the example embodiment of the disclosure illustrated in FIG. 5, digitization (via the ADCs $508_1$-$508_N$) is shown to be implemented after downconversion (via the mixers $504_1$-$504_N$). Notwithstanding, the disclosure may not be so limited. For example, downconversion (or frequency translation) may be implemented after the digitization which may be implemented at the outputs of the low-noise amplifiers (LNAs $502_1$-$502_N$). In such instances, a "full spectrum capture" on input signals may be illustrated without departing from the spirit and scope of various embodiments of the disclosure.

Figure 6:
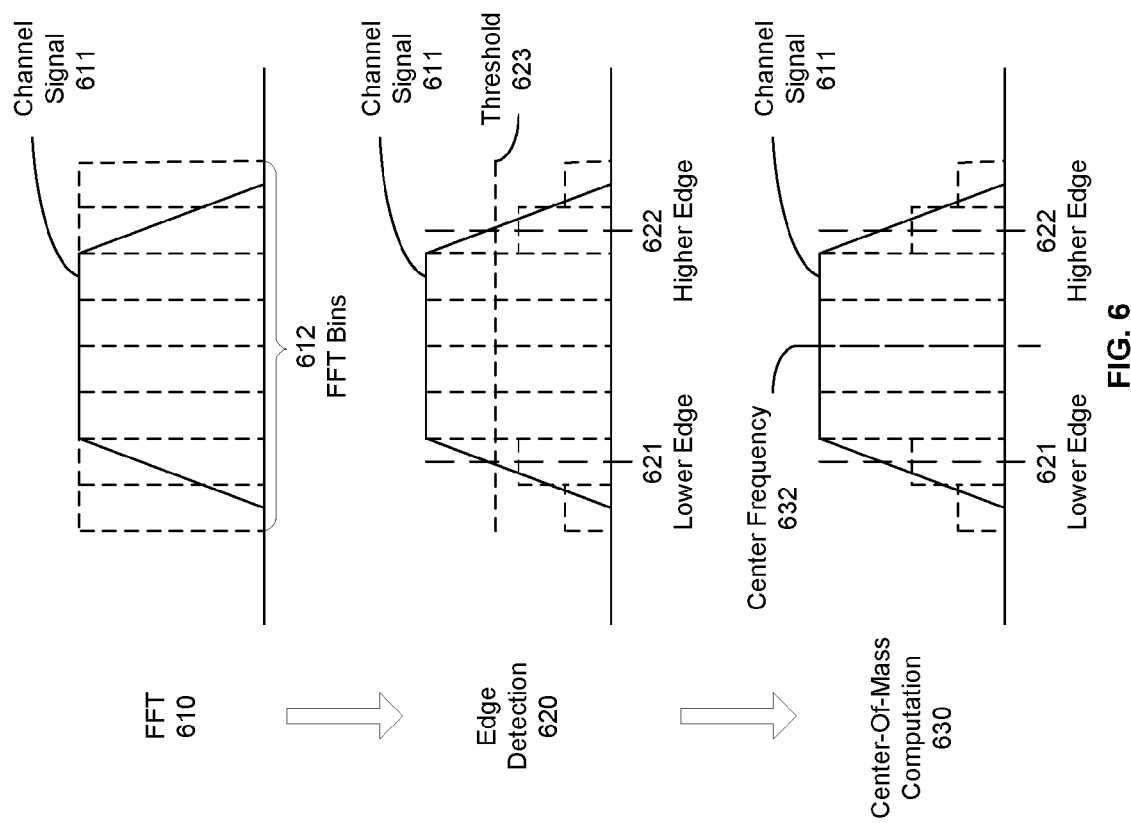
FIG. 6 is a block diagram illustrating an exemplary implementation of frequency analysis, in accordance with an example embodiment of the invention.

FIG. 6 is a block diagram illustrating an exemplary implementation of frequency analysis, in accordance with an example embodiment of the invention. Referring to FIG. 6, there is shown a FFT 610, an edge detection 620 and a center-of-mass computation 630. There is also shown a channel signal 611 in frequency domain.

In the example implementation shown in FIG. 6, the FFT 610 may be applied to a digital signal (such as the signal $505_1$ of FIG. 5) corresponding to channels (or bands). The FFT 610 may convert, for example, a channel signal from time-domain samples to frequency-domain samples such as the channel signal 611. In this regard, the channel signal 611 may be represented by a plurality of FFT bins 612. The edge detection 620 may be used to determine a lower edge 621 and a higher edge 622, based on power level information associated with the FFT bins 612. For example, based on a power level of a particular FFT bin relative to power levels of adjacent bins as well as based on a corresponding threshold 623, the edges 621, 622 may be determined by the edge detection 620. Accordingly, based on the edges 621, 622 and edges of adjacent channels (or bands), one or more actual guard bands may be determined.

The center-of-mass computation 603 may be used to determine a center frequency 632 of the channel signal 611. The center-of-mass computation 630 may compute or determine the center frequency 632, based on, for example, power level information and frequency information associated with the FFT bins 612 and/or information on the edges 621, 622. Accordingly, based on the center frequency 632, a LO frequency offset associated with the channel signal 611 may be determined.

Figure 7:
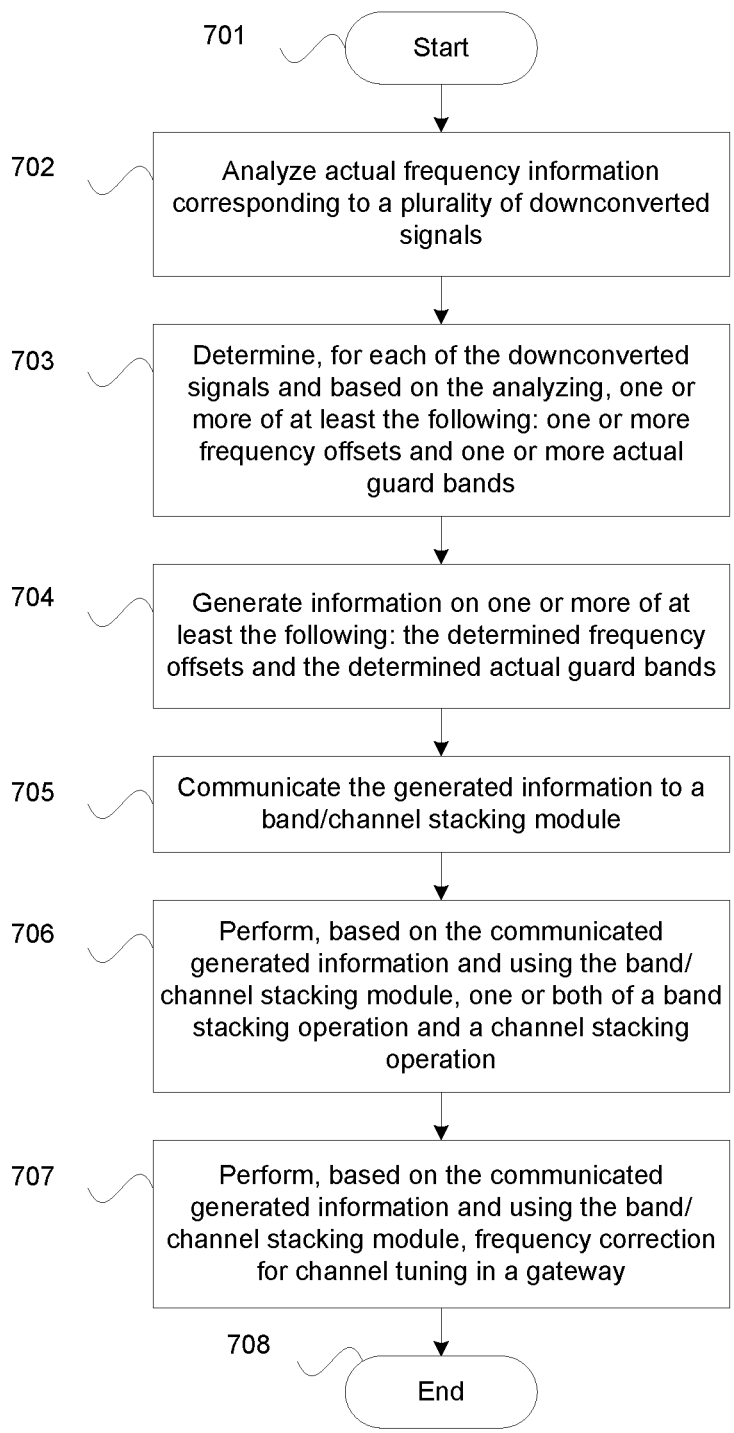
FIG. 7 is a flow chart illustrating exemplary steps for guard band detection and frequency offset detection, in accordance with an example embodiment of the invention.

FIG. 7 is a flow chart illustrating exemplary steps for guard band detection and frequency offset detection, in accordance with an example embodiment of the invention. Referring to FIG. 7, the exemplary steps start at step 701. In step 702, the signal processing circuit 120 may be operable to analyze, using the frequency detection module 230, actual frequency information 621, 622, 632 corresponding to a plurality of downconverted signals 205. Each of the plurality of downconverted signals 205 may be downconverted using one or more corresponding LOs ($LO_1$-$LO_N$) in the signal processing circuit 120. In step 703, by using the frequency detection module 230, the signal processing circuit 120 may be operable to determine, for each of the downconverted signals 205 and based on the analyzing, one or more of at least the following: (1) one or more frequency offsets 336, 346, which are associated with the one or more corresponding local LOs ($LO_1$-$LO_N$), in relation to corresponding standard LO frequencies, and (2) one or more actual guard bands 334, 335, 344 between adjacent frequency bands. In step 704, the signal processing circuit 120 may be operable to generate, using the frequency detection module 230 and for the plurality of downconverted signals 205, information 210 on one or more of at least the following: the determined frequency offsets 336, 346 and the determined actual guard bands 334, 335, 344. In step 705, by using the frequency detection module 230, the generated information 210 may be communicated to the band/channel stacking module 220 in the signal processing circuit 120. In step 706, the signal processing circuit 120 may then be operable to perform, based on the communicated generated information 210 and using the band/channel stacking module 220, one or both of a band stacking operation and a channel stacking operation so that: (1) during the band stacking operation, frequency bands 313, 323 are not stacked on each other or stacked frequency bands 313, 323 do not overlap, and (2) during the channel stacking operation, channels 311, 312, 322 are not stacked on each other or stacked channels 311, 312, 322 do not overlap during the channel stacking operation. In step 707, the signal processing circuit 120 may also be operable to perform, based on the communicated generated information 210 and using the band/channel stacking module 220, frequency corrections, in compliance with standard band frequencies and standard channel frequencies, on output signals 350 of the band stacking operation or output signals 350 of the channel stacking operation, for channel tuning in a gateway such as the gateway 102. The exemplary steps may proceed to the end step 708.

In various embodiments of the invention, a signal processing circuit 120, which is operational within a satellite reception assembly 106, may be operable to analyze actual frequency information 621, 622, 632 corresponding to a plurality of downconverted signals 205. Each of the plurality of downconverted signals 205 may be downconverted using one or more corresponding LOs ($LO_1$-$LO_N$) in the signal processing circuit 120 (e.g., within LNBs $202_1$-$202_N$). For each of the downconverted signals 205 and based on the analyzing, one or more of at least the following may be determined by the signal processing circuit 120: (1) one or more frequency offsets 336, 346, which are associated with the one or more corresponding LOs ($LO_1$-$LO_N$), in relation to corresponding standard LO frequencies, and (2) one or more actual guard bands 334, 335, 344 between adjacent frequency bands. The signal processing circuit 120 may be operable to generate, for the plurality of downconverted signals 205, information 210 on one or more of at least the following: the determined frequency offsets 336, 346 and the determined actual guard bands 334, 335, 344. The generated information 210 may be communicated to a band/channel stacking module 220 in the signal processing circuit 120.

The signal processing circuit 120 may then be operable to perform, based on the communicated generated information 210 and using the band/channel stacking module 220, one or both of a band stacking operation and a channel stacking operation so that: (1) during the band stacking operation, frequency bands 313, 323 are not stacked on each other or stacked frequency bands 313, 323 do not overlap, and (2) during the channel stacking operation, channels 311, 312, 322 are not stacked on each other or stacked channels 311, 312, 322 do not overlap during the channel stacking operation. The signal processing circuit 120 may also be operable to perform, based on the communicated generated information 210 and using the band/channel stacking module 220, frequency corrections, in compliance with standard band frequencies and standard channel frequencies, on output signals 350 of the band stacking operation or output signals 350 of the channel stacking operation, for channel tuning in a gateway 102. In this regard, the signal processing circuit 120 may be operable to downconvert a plurality of RF signals ($RF_1$-$RF_N$) to the plurality of downconverted signals 205 correspondingly, where each of the RF signals may correspond to one or more satellite frequency bands, and the downconverted signals 205 may comprises, for example, L-band signals or baseband signals. The signal processing circuit 120 may be operable to perform the analyzing, the determining, the generating and the communicating, using, for example, a frequency detection module 230 in the signal processing circuit 120.

In an exemplary embodiment of the disclosure, the frequency detection module 430 may comprise a demodulator 440. In other instances, the frequency detection module 430 may comprise, for example, at least a portion of a demodulator 440, where the at least a portion of the demodulator may comprise a PLL 442.

In an exemplary embodiment of the disclosure, the plurality of downconverted signals $505_1$-$505_N$ may be in digital domain and the frequency detection module 530 may be operational in the digital domain. In such instances, the frequency detection module 530 may perform the analyzing using one or more of the following: a FFT 610, an edge detection 620 and a center-of-mass computation 630. The frequency detection module 530 may also determine, based on the edge detection 620, a symbol rate associated with each channel 611 for channel filtering in the band/channel stacking module 520, during at least the channel stacking operation, for example.

In an exemplary embodiment of the disclosure, each of the LOs ($LO_1$-$LO_N$) may comprise a dielectric resonant oscillator (DRO). The generated information 210 may comprise, for example, a form of a matrix 212, where each element of the matrix 212 may correspond to one of at least the following: a particular frequency offset (e.g., the frequency offset 336) associated with a particular LO (e.g., the $LO_1$) and a particular actual guard band (e.g., the guard band 334) associated with a particular downconverted signal (e.g., the signal 330).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for guard band detection and frequency offset detection.

Accordingly, aspects of the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
analyzing a plurality of downconverted signals, wherein said analyzing comprises performing a center-of-mass computation;
determining based on said analyzing of said plurality of downconverted signals, for each of said plurality of downconverted signals, frequency related information associated with one or more corresponding circuits used in obtaining said plurality of downconverted signals;
performing, based on said frequency related information, one or both of a band stacking operation and a channel stacking operation; wherein:
during said band stacking operation, frequency bands are not stacked on each other or stacked frequency bands do not overlap; and
during said channel stacking operation, channels are not stacked on each other or stacked channels do not overlap.

2. The method of claim 1, comprising determining said frequency related information based on predefined frequency related parameters associated with said one or more corresponding circuits.

3. The method of claim 1, wherein said frequency related information comprises frequency offsets.

4. The method of claim 3, comprising determining said frequency offsets based on standard frequencies associated with said one or more corresponding circuits.

5. The method according to claim 1, comprising performing, based on said frequency related information, frequency corrections, in compliance with standard band frequencies and standard channel frequencies, on output signals of said band stacking operation or output signals of said channel stacking operation, for channel tuning in a gateway.

6. The method according to claim 1, comprising generating said plurality of downconverted signals based on a plurality of radio frequency (RF) signals.

7. The method according to claim 6, wherein each of said RF signals corresponds to one or more satellite frequency bands, and said downconverted signals comprises L-band signals or baseband signals.

8. The method according to claim 1, wherein said analyzing further comprises performing one or both of: a fast Fourier transform (FFT) and an edge detection.

9. The method according to claim 8, comprising determining based on said edge detection, a symbol rate associated with each channel for channel filtering applied during at least said channel stacking operation.

10. The method according to claim 1, comprising generating, based on said frequency related information, a matrix comprising one or more elements, with each of said one or more elements of said matrix corresponding to a particular frequency parameter associated with a particular one of said one or more corresponding circuits.

11. A system, comprising:
a frequency detection circuit operable to:
analyze a plurality of downconverted signals, wherein said analyzing comprises performing a center-of-mass computation; and
determine based on said analyzing of said plurality of downconverted signals, for each of said plurality of downconverted signals, frequency related information associated with one or more corresponding circuits used in obtaining said plurality of downconverted signals; and
a stacking circuit operable to perform, based on said frequency related information, one or both of a band stacking operation and a channel stacking operation, wherein:
during said band stacking operation, frequency bands are not stacked on each other or stacked frequency bands do not overlap; and
during said channel stacking operation, channels are not stacked on each other or stacked channels do not overlap.

12. The system according to claim 11, wherein said frequency detection circuit is operable to determine said frequency related information based on predefined frequency related parameters associated with said one or more corresponding circuits.

13. The system according to claim 11, wherein:
said frequency related information comprises frequency offsets; and
said frequency detection circuit is operable to determine said frequency offsets based on standard frequencies associated with said one or more corresponding circuits.

14. The system according to claim 11, wherein said stacking circuit is operable to perform, based on said frequency related information, frequency corrections, in compliance with standard band frequencies and standard channel frequencies, on output signals of said band stacking operation or output signals of said channel stacking operation, for channel tuning in a gateway.

15. The system according to claim 11, comprising one or more signal processing circuit operable to generate said plurality of downconverted signals based on a plurality of radio frequency (RF) signals.

16. The system according to claim 11, wherein said frequency detection circuit is operable to, when performing said analyzing of said plurality of downconverted signals, further perform one or both of: a fast Fourier transform (FFT) and an edge detection.

17. The system according to claim 16, wherein said frequency detection circuit is operable to determine based on said edge detection, a symbol rate associated with each channel for channel filtering applied during at least said channel stacking operation.

18. The system according to claim 11, wherein said frequency detection circuit is operable to generate based on said frequency related information, a matrix comprising one or more elements, with each of said one or more elements of said matrix corresponding to a particular frequency parameter associated with a particular one of said one or more corresponding circuits.

19. The system according to claim 11, wherein said frequency detection circuit comprises a demodulator.

20. The system according to claim 11, wherein said frequency detection module comprises a phase locked loop (PLL).

21. The system according to claim 11, wherein said one or more corresponding circuits comprise one or more local oscillators (LOs).

22. The system according to claim 21, wherein each of said one or more local oscillators (LOs) comprises a dielectric resonant oscillator (DRO).

* * * * *